(12) United States Patent
Ito

(10) Patent No.: US 6,687,406 B2
(45) Date of Patent: Feb. 3, 2004

(54) IMAGE CODING WITHOUT CODING CLIPPED REGIONS

(75) Inventor: Wataru Ito, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/138,577

(22) Filed: May 6, 2002

(65) Prior Publication Data

US 2002/0126909 A1 Sep. 12, 2002

Related U.S. Application Data

(62) Division of application No. 09/388,381, filed on Sep. 1, 1999.

(30) Foreign Application Priority Data

Sep. 21, 1998 (JP) .............................. 10-267034
Apr. 21, 1999 (JP) .............................. 11-113085

(51) Int. Cl.$^7$ .............................. G06K 9/36; G06K 9/46
(52) U.S. Cl. .................... 382/232; 382/100; 382/166; 382/282
(58) Field of Search .................... 382/166, 232, 382/239, 243, 282, 100; 375/240.02, 240.08

(56) References Cited

U.S. PATENT DOCUMENTS

| | | | | |
|---|---|---|---|---|
| 4,694,352 A | * | 9/1987 | Ina et al. ..................... | 358/426 |
| 5,057,940 A | * | 10/1991 | Murakami et al. ........... | 358/426 |
| 5,748,789 A | * | 5/1998 | Lee et al. ..................... | 382/243 |
| 5,872,573 A | * | 2/1999 | Adegeest ..................... | 345/434 |
| 6,175,639 B1 | * | 1/2001 | Satoh et al. ................. | 382/100 |
| 6,208,347 B1 | * | 3/2001 | Migdal et al. ............... | 345/419 |
| 6,377,269 B1 | * | 4/2002 | Kay et al. .................... | 345/589 |

FOREIGN PATENT DOCUMENTS

| | | | |
|---|---|---|---|
| JP | 4-223767 A | 8/1992 | ............ H04N/1/32 |
| JP | 5199424 | 8/1993 | ............ H04N/1/44 |
| JP | 6125553 | 5/1994 | ............ H04N/7/167 |
| JP | 9102033 | 4/1997 | ............. G06T/1/00 |

* cited by examiner

*Primary Examiner*—Timothy M. Johnson
(74) *Attorney, Agent, or Firm*—Birch, Stewart, Kolasch & Birch, LLP

(57) ABSTRACT

An image encoding method includes a step in which image data of components other than image data of components representing the transparency of an image is encoded from among image data of components which includes image data of components representing the transparency of the image, and a step in which an image file is created from image data of components encoded in the encoding step and image data of components other than image data of components encoded in the encoding step. Accordingly, because image data of components representing the transparency of the image is not encoded in the encoded image file, the image shape can be recognized. Moreover, because the image data of the remaining components is encoded, the security of the details of the image data can be maintained.

16 Claims, 4 Drawing Sheets

BACKGROUND IMAGE A

ORIGINAL IMAGE OF IMAGE B

ENCODED IMAGE B (HATCHED PORTION $\alpha = 1$, OTHER PORTION $\alpha = 0$)

SYNTHESIZED IMAGE

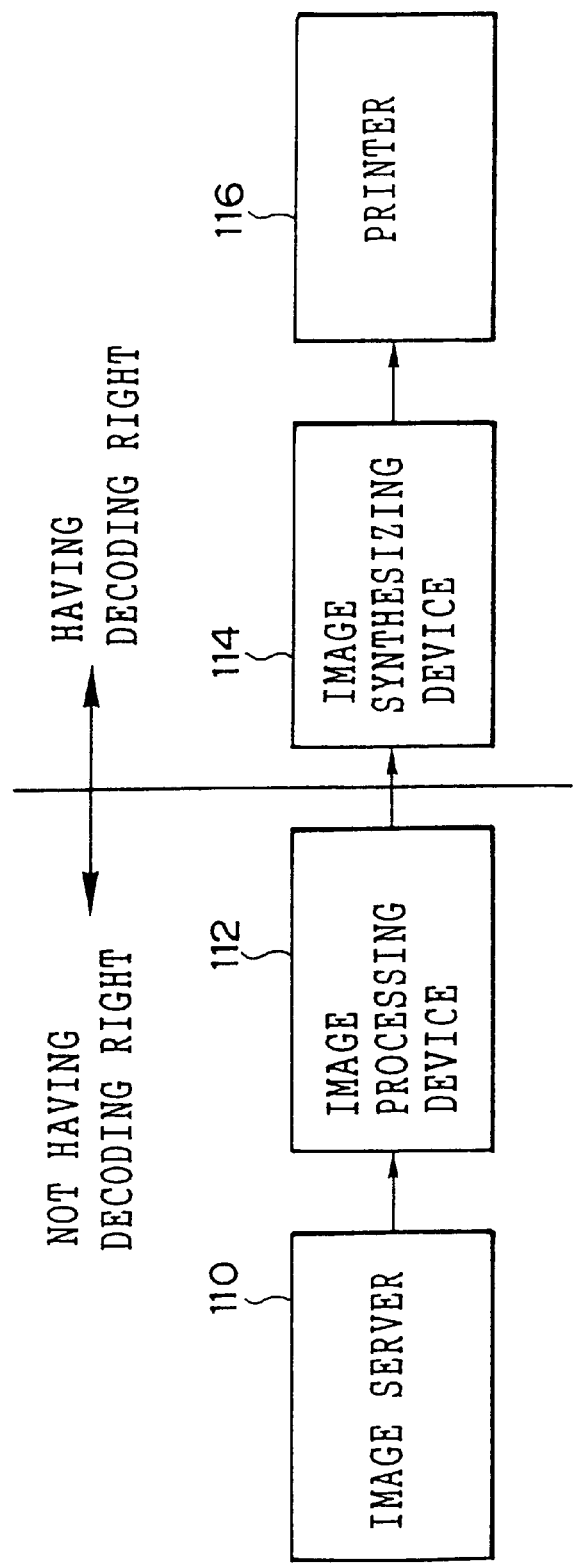

IMAGE CODING WITHOUT CODING CLIPPED REGIONS

This application is a divisional of co-pending application Ser. No. 09/388,381, filed on Sep. 1, 1999, the entire contents of which are hereby incorporated by reference and for which priority is claimed under 35 U.S.C. §120; and this application claims priority of Application Ser. Nos. 10-267034 and 11-113085 filed in Japan on Sep. 21, 1998 and Apr. 21, 1999, respectively under 35 U.S.C. §119.

BACKGROUND OF THE INVENTION

1. Field of the Invention

The present invention relates to an image encoding device which encodes an image and effects image processing such as image synthesis onto the encoded image, an image encoding method, a recording medium which records the procedure of image encoding, and a recording medium which records an image file.

2. Description of the Related Art

Conventional encoding devices of this type include, for example, the technologies disclosed in Japanese Patent Application Laid-Open (JPA) No. 5-199424 and Japanese Patent Application Laid-Open (JPA) No. 6-125553. The former is an example of image encoding and describes, as a conventional method, a simple method to use in the conventional method using an open key or a common key. A method of encoding by changing the permutation of image blocks is also proposed as an alternative method.

The latter is also an example of image encoding. Because the burden of encoding all the images is too large a method of encoding only the DC component of signals which are subjected to frequency conversion (DCT conversion) is proposed.

Further, an image format includes the one which has four channels of R, G, B, and $\alpha$ which is used in an embodiment of Japanese Patent Application Laid-Open (JPA) No. 9-102033. In a normal color image, the pixel color is determined from the three values of R, G, and B. The RGB $\alpha$ format has another value $\alpha$ which represents the transparency of the pixel. When the image is superposed on another image and synthesized, the image below is transparent and the degree of transparency is controlled by the value of $\alpha$.

The normal image is rectangular. However, a clipped image can be obtained by defining an arbitrary image within the rectangular image using this $\alpha$ channel.

Moreover, in the case of the RGB $\alpha$ format, the encoding processing described in the aforementioned Japanese Patent Application Laid-Open (JPA) No. 5-199424 and Japanese Patent Application Laid-Open (JPA) No. 6-125553 is carried out every four channels, and the entire file is encoded using an open key or a common key.

However, in the aforementioned conventional technologies, when a background image has an RGB $\alpha$ format image superposed thereon, only the RGB $\alpha$ data is encoded. Thus, when the background image file, the encoded RGB $\alpha$ file, and the information which determines the position of synthesis are transferred, there is a drawback in that a device other than the device having the final decoding right cannot recognize how the RGB $\alpha$ file is superposed on the background image file. Further, when a portion of an image, in which all of the channels of R, G, B, and $\alpha$ are encoded, is adhered onto another background image, all of the data in the two images must be read and thereby the processing speed is reduced.

SUMMARY OF THE INVENTION

The present invention was developed in order to solve the above-described drawbacks, and the object thereof is to enable the configuration of an image to be known even by a device which does not have a decoding right, when an image having RGB $\alpha$ format is encoded, and to improve the processing speed of the image of the encoded image data.

The first aspect of the present invention is an image encoding device comprising: input means for inputting an image file by reading an image file which represents an image; separating means for separating the image file into image data of predetermined components including at least image data of components representing the transparency of the image; encoding means for encoding, from among image data separated by the separating means, image data of components other than image data of components representing the transparency of the image; and file generating means for generating an image file from image data of components encoded by the encoding means and image data of components other than image data of components encoded by the encoding means.

According to the first aspect, an image file representing an image is read by the input means. The image file read by the input means is then separated into image data of predetermined components including at least the image data of components representing the transparency of the image. The encoding means then encodes image data of components other than at least the image data of components representing the transparency of the image from among the separated image data. The image file generating means then generates an image file from the encoded image data of components and image data of components other than the unencoded image data of components.

In this way, because the image data of components representing the transparency of the image is not encoded in the encoded image file, the shape of the image can be known. Moreover, because the remaining image data of components is encoded, the security of the detailed image data can be maintained.

The second aspect of the present invention is an image encoding device, wherein an area occupied by the portion of the image which is to be clipped from within the image area is detected on the basis of image data of components representing the transparency of the image.

According to the second aspect, the area occupied by the portion of the image which is to be clipped from within the image area can be detected on the basis of the image data of components representing the transparency of the image.

For example, if the value $\alpha$ of unencoded image data of components representing the transparency of an image is set to 0 for transparent and 1 for opaque, the value of each pixel in the image portion to be clipped from within the image area is extracted as either 0 or 1. Therefore, the shape, position, and size of the clipped image can be detected. Translucent portions of the image, where $0<\alpha<1$, can be freely clipped by clipping portions where $\alpha$ is other than 0 or 1.

Moreover, when the portion clipped this way is pasted onto another image, the image data of components of the portion of the pasted over image which overlaps with the clipped image does not have to be processed. Accordingly, the processing time when image processing such as image transmission or image conversion are performed can be shortened.

The third aspect of the present invention is an image encoding device comprising: input means for inputting an image file by reading an image file which represents an image; separating means for separating the image file into image data of predetermined components including at least image data of components having information specifying an area of the image to be clipped; encoding means for encoding, from among image data separated by the separating means, image data of components other than image data of components having information specifying an area of the image to be clipped; and file generating means for generating an image file from image data of components encoded by the encoding means and image data of components other than image data of components encoded by the encoding means.

According to the third aspect, an image file representing an image is read by the input means. The image file read by the input means is then separated into image data of predetermined components including at least the image data of components having information specifying the area of the image to be clipped. The encoding means then encodes image data of components other than at least the image data of components having the information specifying the area of the image to be clipped from among the separated image data of components. The image file generating means then generates an image file from the encoded image data of components and the image data of components other than the encoded image data of components.

In this way, because, in the encoded image file, image data of components specifying the area of the image to be clipped is not encoded, the shape of the image can be recognized. Moreover, because the remaining image data of components is encoded, the security of the details of the image data can be maintained.

The fourth aspect of the present invention is an image encoding method comprising the steps of: reading an image file representing an image and separating the image file into image data of predetermined components including at least image data of components having information specifying the area of the image to be clipped; encoding image data of components other than image data of components having information specifying the area of the image to be clipped from the separated image data; and generating an image file from encoded image data of components and image data of components other than encoded image data of components.

According to the fourth aspect, image encoding is performed in the following manner. An image file representing an image is read, this image file is separated into image data of predetermined components including at least image data of components representing the transparency of the image, and image data of components other than at least the image data of components representing the transparency of the image is encoded from among the separated image data of components. An image file is then generated from the encoded image data of components and the image data of components other than the encoded image data of components.

In this way, because, in the encoded image file, image data of components representing the transparency of the image is not encoded, the shape of the image can be recognized. Moreover, because the remaining image data of components is encoded, the security of the details of the image data can be maintained.

The fifth aspect of the present invention is an image encoding device, wherein an area occupied by the portion of the image which is to be clipped from within the image area is detected on the basis of image data of components representing the transparency of the image.

According to the fifth aspect, the area occupied by the portion of the image which is to be clipped from within the image area can be detected on the basis of the image data of components representing the transparency of the image.

For example, if the value $\alpha$ of unencoded image data of components representing the transparency of an image is set to 0 for transparent and 1 for opaque, the value of each pixel in the image portion to be clipped from within the image area is extracted as either 0 or 1. Therefore, the shape, position, and size of the clipped image can be detected. Translucent portions of the image, where $0<\alpha<1$, can be freely clipped by clipping portions where $\alpha$ is other than 0 or 1.

Moreover, when the portion clipped in the above-described method is pasted onto another image, the image data of the portion of the pasted over image which overlaps with the clipped image does not have to be processed. Accordingly, the processing time when image processing such as image transmission or image conversion are performed can be shortened.

The sixth aspect of the present invention is an image encoding method, in which an image file representing an image is read and the image file is separated into image data of predetermined components including at least image data of components having information specifying the area of the image to be clipped; image data, other than at least image data of components having information specifying the area of the image to be clipped is encoded from among the separated image data; and an image file is generated from encoded image data of components and image data of components other than encoded image data of components.

According to the sixth aspect, image encoding is performed in the following manner. An image file representing an image is read, this image file is separated into image data of predetermined components including at least image data of components having information on the area of the image to be clipped, and image data of components other than at least the image data of components having information on the area of the image to be clipped is encoded from among the separated image data of components. An image file is then generated from the encoded image data of components and the image data of components other than the unencoded image data of components.

In this way, because, in the encoded image file, image data of components having information on the area of the image to be clipped is not encoded, the shape of the image can be recognized. Moreover, because the remaining image data of components is encoded, the security of the details of the image data can be maintained.

The seventh aspect of the present invention is a recording medium for recording an image encoding procedure, wherein the image encoding procedure includes: a first step in which an image file representing an image is read and the image file is separated into image data of predetermined components including at least image data of components representing the transparency of the image; a second step in which image data of components other than image data of components representing the transparency of the image is encoded from the separated image data; and a third step in which an image file is generated from encoded image data of components and image data of components other than encoded image data of components.

According to the seventh aspect, image encoding is performed in the following manner. In the first step, an image file representing an image is read and the image file is separated into image data of predetermined components including at least image data of components representing the transparency of the image. Consequently, in the second step, image data of components other than image data of components representing the transparency of the image is encoded from the separated image data of components. Further, in the third step, an image file is generated from encoded image data of components and image data other than encoded image data of components.

In this way, because, in the encoded image file, image data of components representing the transparency of the image is not encoded, the shape of the image can be recognized. Moreover, because the remaining image data of components is encoded, the security of the details of the image data can be maintained.

The eighth aspect of the present invention is a recording medium for recording an image encoding procedure, wherein an area occupied by the portion of the image which is to be clipped from within the image area is detected on the basis of image data of components representing the transparency of the image.

According to the eighth aspect, the area occupied by the portion of the image which is to be clipped from within the image area can be detected on the basis of the image data of components representing the transparency of the image.

For example, if the value $\alpha$ of unencoded image data of components representing the transparency of an image is set to 0 for transparent and 1 for opaque, the value of each pixel in the image portion to be clipped from within the image area is extracted as either 0 or 1. Therefore, the shape, position, and size of the clipped image can be detected. Translucent portions of the image, where $0<\alpha<1$, can be freely clipped by clipping portions where $\alpha$ is other than 0 or 1.

Moreover, when the portion clipped this way is pasted onto another image, the image data of components of the portion of the pasted over image which overlaps with the clipped image does not have to be processed. Accordingly, the processing time when image processing such as image transmission or image conversion are performed can be shortened.

The ninth aspect of the present invention is a recording medium for recording an image encoding procedure, wherein the image encoding procedure includes: a first step in which an image file representing an image is read and the image file is separated into image data of predetermined components including at least image data of components having information specifying the area of the image to be clipped; a second step in which image data of components other than image data of components having information specifying the area of the image to be clipped is encoded from the separated image data; and a third step in which an image file is generated from encoded image data of components and image data of components other than encoded image data of components.

According to the ninth aspect of the present invention, an image is encoded according to the following procedure. In the first step an image file representing an image is read and the image file is separated into image data of predetermined components which include at least image data of components having information specifying the area of the image to be clipped. Subsequently, in the second step, image data of components other than image data of components having information specifying the area of the image to be clipped is encoded from the separated image data. Further, in the third step, an image file is generated from encoded image data of components and image data of components other than the encoded image data of components.

In this way, because, in the encoded image file, image data of components representing the transparency of the image is not encoded, the shape of the image can be recognized. Moreover, because the remaining image data of components is encoded, the security of the details of the image data can be maintained.

The tenth aspect of the present invention is a recording medium for recording an image file, wherein an image file representing an image is read and the image file is separated into image data of predetermined components including at least image data of components representing the transparency of the image, image data of components other than image data of components representing the transparency of the image is encoded from the separated image data, and an image file is generated from encoded image data of components and image data of components other than encoded image data of components.

According to the tenth aspect of the present invention, an image file representing an image is read and the image file is separated into at least image data of components representing the transparency of the image. Image data of components other than image data of components representing the transparency of the image is then encoded from the separated image data and an image file is generated from the encoded image data of components and the image data of components other than the encoded image data of components. This image file may then be recorded onto, for example, an image server, a CD-R, or the like, enabling the security of the image to be maintained.

In this way, because, in the encoded image file, image data of components representing the transparency of the image is not encoded, the shape of the image can be recognized. Moreover, because the remaining image data of components is encoded, the security of the details of the image data can be maintained.

The eleventh aspect of the present invention is a recording medium for recording an image file, wherein an area occupied by the portion of the image which is to be clipped from within the image area is detected on the basis of image data of components representing the transparency of the image.

According to the eleventh aspect, an area occupied by the portion of the image which is to be clipped from within the image area can be detected on the basis of the image data of components representing the transparency of the image.

For example, if the value $\alpha$ of unencoded image data of components representing the transparency of an image is set to 0 for transparent and 1 for opaque, the value of each pixel in the image portion to be clipped from within the image area is extracted as either 0 or 1. Therefore, the shape, position, and size of the clipped image can be detected. Translucent portions of the image, where $0<\alpha<1$, can be freely clipped by clipping portions where $\alpha$ is other than 0 or 1.

Moreover, when an image clipped from a recording medium on which is recorded an image file generated in this way is read and pasted onto another image, the image data of the portion of the pasted over image which overlaps with the clipped image does not have to be processed. Accordingly, the processing time when image processing such as image transmission or image conversion are performed can be shortened.

The twelfth aspect of the present invention is a recording medium for recording an image file, wherein an image file representing an image is read and the image file is separated into image data of predetermined components including at least image data of components having information specifying the area of the image to be clipped, image data of components other than image data of components having information specifying the area of the image to be clipped is encoded from the separated image data, and an image file is generated from encoded image data of components and image data of components other than encoded image data of components.

According to the twelfth aspect of the present invention, an image file representing an image is read and the image file is separated into image data of predetermined components which include at least image data of components having information specifying the area of the image to be clipped. Image data of components other than image data of components having information specifying the area of the image to be clipped is then encoded from the separated image data, and an image file is generated from the encoded image data of components and the image data of components other than the encoded image data of components. This image file may then be recorded on, for example, an image server, a CD-R, or the like, enabling the security of the image to be maintained.

In this way, because, in the encoded image file, image data of components having information specifying the area of the image to be clipped is not encoded, the shape of the image can be recognized. Moreover, because the remaining image data of components is encoded, the security of the details of the image data can be maintained.

The thirteenth aspect of the present invention is an image encoding device comprising: encoding means for encoding image data of components other than image data of components representing the transparency of an image from among image data which includes image data of components representing the transparency of the image; and file generating means for generating an image file from image data of components encoded by the encoding means and image data of components other than image data of components encoded by the encoding means.

According to the thirteenth aspect of the present invention, encoding means encodes image data of components other than the image data of components which represent the transparency of an image from among image data of components which includes image data of components representing the transparency of the image and file generating means generates an image file comprising image data of components encoded by the encoding means and image data of components other than image data of components encoded by the encoding means.

In this way, because, in the encoded image file, image data of components representing the transparency of the image is not encoded, the shape of the image can be recognized. Moreover, because the remaining image data of components is encoded, the security of the details of the image data can be maintained.

The fourteenth aspect of the present invention is an image encoding device, wherein an area occupied by the portion of the image which is to be clipped from within the image area is detected on the basis of the image data of components representing the transparency of the image.

According to the fourteenth aspect of the present invention, an area occupied by the portion of the image which is to be clipped from within the image area can be detected on the basis of the image data of components representing the transparency of the image.

For example, if the value $\alpha$ of unencoded image data of components representing the transparency of an image is set to 0 for transparent and 1 for opaque, the value of each pixel in the image portion to be clipped from within the image area is extracted as either 0 or 1. Therefore, the shape, position, and size of the clipped image can be detected. Translucent portions of the image, where $0<\alpha<1$, can be freely clipped by clipping portions where $\alpha$ is other than 0 or 1.

Moreover, when the portion clipped this way is pasted onto another image, the image data of components of the portion of the pasted over image which overlaps with the clipped image does not have to be processed. Accordingly, the processing time when image processing such as image transmission or image conversion are performed can be shortened.

The fifteenth aspect of the present invention is an image encoding device comprising: encoding means for encoding image data of components other than image data of components having information specifying the area of an image to be clipped from among image data of components which includes image data of components having information specifying the area of the image to be clipped; and file generating means for generating an image file from image data of components encoded by the encoding means and image data of components other than image data of components encoded by the encoding means.

According to the fifteenth aspect of the present invention, encoding means encodes image data of components other than image data of components having information specifying the area of an image to be clipped from among image data of components which includes image data components having information specifying the area of the image to be clipped, and file generating means generates an image file comprising image data of components encoded by the encoding means and image data of components other than image data of components encoded by the encoding means.

Because, in an image file encoded in this way, image data of components specifying the area of the image to be clipped is not encoded, the shape of the image can be recognized. Moreover, because the remaining image data of components is encoded, the security of the details of the image data can be maintained.

The sixteenth aspect of the present invention is an image encoding method comprising the steps of: encoding image data of components other than image data of components representing the transparency of an image from among image data which includes image data of components representing the transparency of the image; and generating an image file from encoded image data of components and image data of components other than encoded image data of components.

According to the sixteenth aspect of the present invention, an image is encoded in the following manner. Image data of components other than image data of components representing the transparency of an image are encoded from among image data of components which includes image data of components representing the transparency of the image. An image file is then generated from the encoded image data of components and image data of components other than the encoded image data of components.

Because, in an image file encoded using this method, image data of components representing the transparency of the image is not encoded, the shape of the image can be recognized. Moreover, because the remaining image data of components is encoded, the security of the details of the image data can be maintained.

The seventeenth aspect of the present invention is an image encoding method, wherein an area occupied by the portion of the image which is to be clipped from within the image area is detected on the basis of the image data of components representing the transparency of the image.

According to the seventeenth aspect of the present invention, an area occupied by the portion of the image which is to be clipped from within the image area can be detected on the basis of the image data of components representing the transparency of the image.

For example, if the value α of unencoded image data of components representing the transparency of an image is set to 0 for transparent and 1 for opaque, the value of each pixel in the image portion to be clipped from within the image area is extracted as either 0 or 1. Therefore, the shape, position, and size of the clipped image can be detected. Translucent portions of the image, where 0<α<1, can be freely clipped by clipping portions where α is other than 0 or 1.

Moreover, when a portion clipped using this method is pasted onto another image, the image data of components of the portion of the pasted over image which overlaps with the clipped image does not have to be processed. Accordingly, the processing time when image processing such as image transmission or image conversion are performed can be shortened.

The eighteenth aspect of the present invention is an image encoding method comprising the steps of: encoding image data of components other than image data of components having information for clipping an image from among image data of components which includes image data of components having information specifying the area of the image to be clipped; and generating an image file from encoded image data of components and image data of components other than encoded image data of components.

According to the eighteenth aspect, an image is encoded in the following manner. Image data of components other than image data of components having information for clipping an image is encoded from among image data of components which includes image data of components having information specifying the area of the image to be clipped. An image file is then generated comprising encoded image data of components and image data of components other than encoded image data of components.

Image data of components other than image data of components having information specifying the area of an image to be clipped is encoded from among image data of components which includes image data of components having information specifying the area of the image to be clipped, and the image file is generated from encoded image data of components and image data of components other than encoded image data of components.

The nineteenth aspect of the present invention is a recording medium for recording an image encoding procedure, wherein the image encoding procedure includes: a first step in which image data of components other than image data of components representing the transparency of the image is encoded from among image data which includes image data of components representing the transparency of the image; and a second step in which an image file is generated from image data of components encoded in the first step and image data of components other than image data of components encoded in the first step.

According to the nineteenth aspect, in a first step, image data of components other than image data of components representing the transparency of the image is encoded from among image data of components which includes image data of components representing the transparency of the image.

In a second step, an image file is generated from image data of components encoded in the first step and image data of components other than image data of components encoded in the first step. The procedure which includes this first step and second step is recorded as a program executed by a computer on a recording medium such as a floppy disk (FD), a hard disk (HD), or a CD-R.

By using a recording medium on which the above procedure is recorded, an image can be encoded. Because, in the encoded image file, image data of components representing the transparency of the image is not encoded, the shape of the image can be recognized. Moreover, because the remaining image data of components is encoded, the security of the details of the image can be maintained.

The twentieth aspect of the present invention is a recording medium for recording an image encoding procedure, wherein an area occupied by the portion of the image which is to be clipped from within the image area is detected on the basis of the image data of components representing the transparency of the image.

According to the twentieth aspect of the present invention, an area occupied by the portion of the image which is to be clipped from within the image area can be detected on the basis of the image data of components representing the transparency of the image.

For example, if the value α of unencoded image data of components representing the transparency of an image is set to 0 for transparent and 1 for opaque, the value of each pixel in the image portion to be clipped from within the image area is extracted as either 0 or 1. Therefore, the shape, position, and size of the clipped image can be detected. Translucent portions of the image, where 0<α<1, can be freely clipped by clipping portions where α is other than 0 or 1.

Moreover, when a portion clipped using this method is pasted onto another image, the image data of components of the portion of the pasted over image which overlaps with the clipped image does not have to be processed. Accordingly, the processing time when image processing such as image transmission or image conversion are performed can be shortened. Moreover, this type of procedure can be recorded as a program executed by a computer on a recording medium such as an FD, HD, or CD-R, which is then distributed as a recording medium on which the image encoding procedure is recorded.

The twenty-first recording medium for recording an image encoding procedure, wherein the image encoding procedure includes: a first step in which image data of components other than image data of components having information specifying the area of the image to be clipped is encoded from among image data of components which includes image data of components having information specifying the area of the image to be clipped; and a second step in which an image file is generated from image data of components encoded in the first step and image data of components other than image data of components encoded in the first step.

According to the twenty-first aspect of the present invention, in a first step, image data of components other than image data of components having information specifying the area of the image to be clipped is encoded from among image data of components which includes image data of components having information specifying the area of the image to be clipped. In a second step, an image file is generated from image data of components encoded in the first step and image data of components other than image data of components encoded in the first step. The procedure which includes this first step and second step is recorded as a program executed by a computer on a recording medium such as a floppy disk (FD), a hard disk (HD), or a CD-R By using a recording medium on which the above procedure is recorded, an image can be encoded. Because, in the encoded image file, image data of components representing the transparency of the image is not encoded, the shape of the image can be recognized. Moreover, because the remaining image data of components is encoded, the security of the details of the image can be maintained.

The twenty-second aspect of the present invention is a recording medium for recording an image file, wherein image data of components other than image data of components representing the transparency of an image is encoded from among image data of components which includes image data of components representing the transparency of the image, and an image file is generated from the encoded image data of components and image data of components other than encoded image data of components.

According to the twenty-second aspect of the present invention, image data of components other than image data of components representing the transparency of an image is encoded from among image data of components which includes image data of components representing the transparency of the image. An image file is then generated comprising the encoded image data of components and image data of components other than the encoded image data of components. The image file is stored on a recording medium such as an FD or a CD-R.

In an image file encoded this way, because image data of components representing the transparency of the image is not encoded, the shape of the image can be recognized. Moreover, because the remaining image data of components is encoded, the security of the details of the image data can be maintained. Moreover, because the encoded image data of components is recorded as an image file on a recording medium, the image file can be distributed.

The twenty-third aspect of the present invention is a recording medium for recording an image file, wherein an area occupied by the portion of the image which is to be clipped from within the image area is detected on the basis of image data of components representing the transparency of the image.

According to the twenty-third aspect, an area occupied by the portion of the image which is to be clipped from within the image area can be detected on the basis of the image data of components representing the transparency of the image.

For example, if the value α of unencoded image data of components representing the transparency of an image is set to 0 for transparent and 1 for opaque, the value of each pixel in the image portion to be clipped from within the image area is extracted as either 0 or 1. Therefore, the shape, position, and size of the clipped image can be detected. Translucent portions of the image, where 0<α<1, can be freely clipped by clipping portions where α is other than 0 or 1.

Moreover, when an image clipped from a recording medium on which is recorded an image file generated in this way is read and pasted onto another image, the image data of components of the portion of the pasted over image which overlaps with the clipped image does not have to be processed. Accordingly, the processing time when image processing such as image transmission or image conversion are performed can be shortened. Moreover, because image data of components encoded in this manner is recorded as an image file on a recording medium, the image file can be distributed.

The twenty-fourth aspect of the present invention is a recording medium for recording an image file, wherein image data of components other than image data of components having information specifying the area of an image to be clipped is encoded from among image data of components which includes image data of components having information specifying the area of the image to be clipped, and an image file is generated from encoded image data of components and image data of components other than encoded image data of components.

According to the twenty-fourth aspect, image data of components other than image data of components having information specifying the area of an image to be clipped is encoded from among image data of components which includes image data of components having information specifying the area of the image to be clipped. An image file is then generated from encoded image data of components and image data of components other than the encoded image data of components.

In an image file encoded this way, because image data of components having information specifying the area of the image to be clipped is not encoded, the shape of the image can be recognized. Moreover, because the remaining image data of components is encoded, the security of the details of the image data can be maintained. Moreover, because the encoded image data is recorded as an image file on a recording medium, the image file can be distributed.

BRIEF DESCRIPTION OF THE DRAWINGS

FIG. 3A shows a background image A, FIG. 3B shows an original image B, FIG. 3C shows encoded image B, and FIG. 3D shows a synthesized image.

FIG. 4 is a block diagram which shows a scheme of an example of a system which uses an image file encoded by the image encoding device.

DESCRIPTION OF THE PREFERRED EMBODIMENTS

Figure 1:
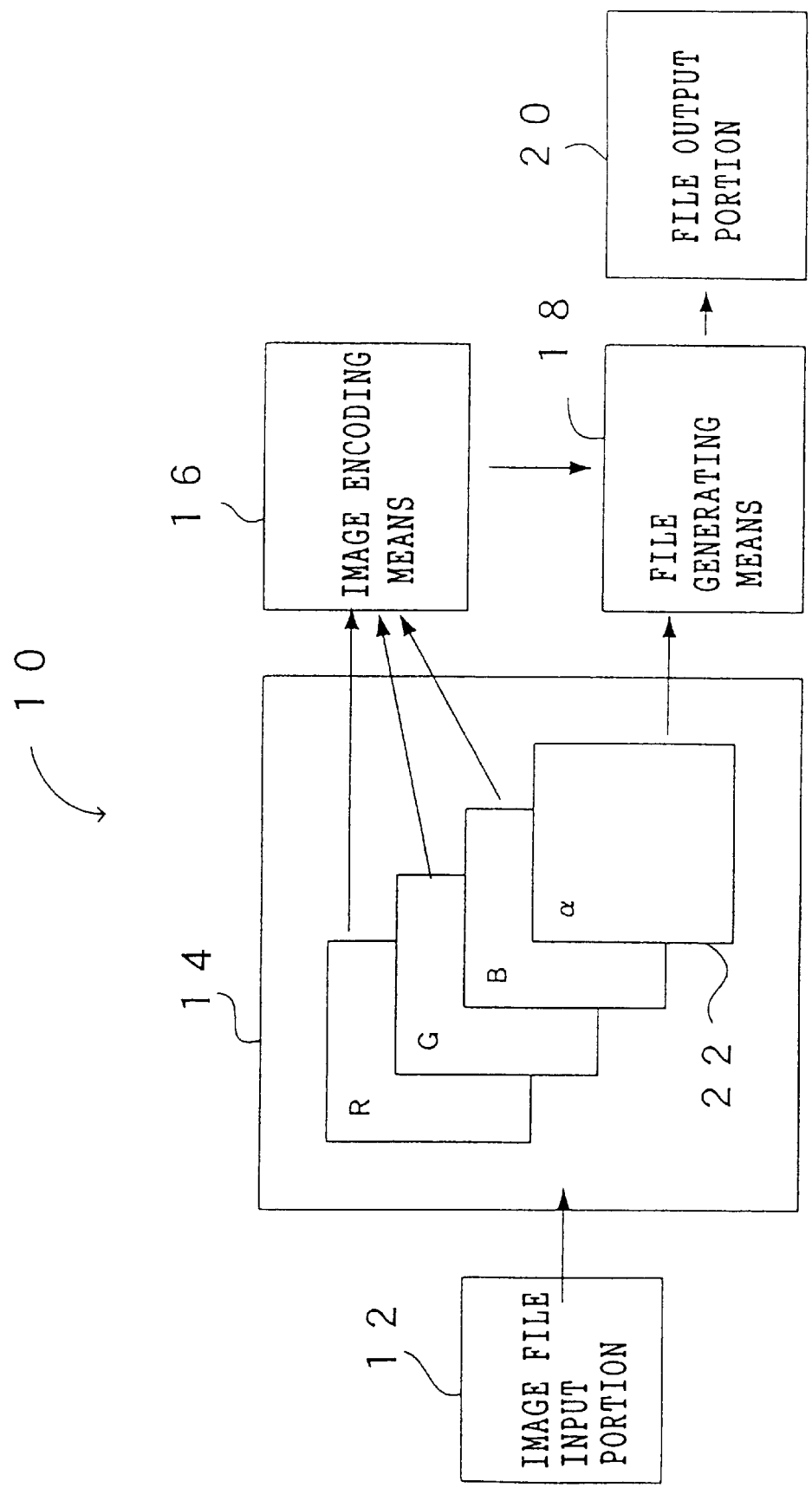
FIG. 1 is a block diagram which shows a scheme of an image encoding device relating to an embodiment of the present invention.

An embodiment of the present invention will now be described in detail with reference to the drawings. FIG. 1 is a schematic block view of an image encoding device 10 in the present embodiment.

As shown in FIG. 1, the image encoding device 10 is formed by an image file input portion 12, an image separating portion 14, an image encoding means 16, a file generating means 18, and a file output portion 20. The image file input portion 12 inputs an image file. The image separating portion 14 separates image data obtained from the image file input portion 12 into four channels formed by R, G, and B channels and an α channel 22 which represents transparency. The image encoding means 16 encodes the respective channels of the separated image. The file generating means 18 generates an image file from the encoded image data. The file output portion 20 outputs the generated image file.

The image file input portion 12 reads the image file via a scanner, a floppy disk, a CD or an MO, a digital camera, or the like and outputs the read image file to the image separating portion 14. This image file is in an RGB α format and is formed from image data having color components of R, G, and B and image data having an α component which represents transparency.

In the image separating portion 14, the image file read by the image file input portion 12 is separated into a total of four channels of image data, i.e., the three channels of the color components R, G, and B and the α channel 22 which represents the transparency of an image. The image data of the separated three channels of R, G, and B is output to the image encoding means 16 and is subjected to encoding processing by the image encoding means 16. The image data which was subjected to encoding processing is output to the file generating means 18. On the other hand, the image data of the α channel 22 of the separated four channels is output to the file generating means 18 as it is without being encoded. Note that the image data of the respective channels R, G, and B is image data which is mapped into values of 0 to 255 in accordance with the image.

Further, a portion of the RGB α formatted image file can be clipped by determining where α=0 (for transparent) and α=1 (for opaque) and adhered to other image data. Note that in the present case, the value of α is set at 1 when the value of α is other than 0. At this time, translucent portions (0<α<1) can be processed by clipping the portions other than where α=0 or portions other than where α=1 and using either one of these. Since encoding is performed for the three channels of R, G, and B, the security of the details of the image data can be maintained. Since encoding is not performed for the α channel 22, only a rough outline of the image can be recognized using the data of the α channel 22.

Moreover, the file generating means 18 generates one file from the encoded image data of the three channels of R, G, and B and the unencoded α channel 22, and outputs an encoded image file to the file output portion 20. The image file output to the file output portion 20 is recorded onto a recording medium such as an image server, a CD-R, or the like.

Next, an example of a system which uses the image file recorded onto the recording medium such as an image server, CD-R, or the like and then encoded by the aforementioned image encoding device 10 will be described with reference to FIG. 2.

Figure 2:
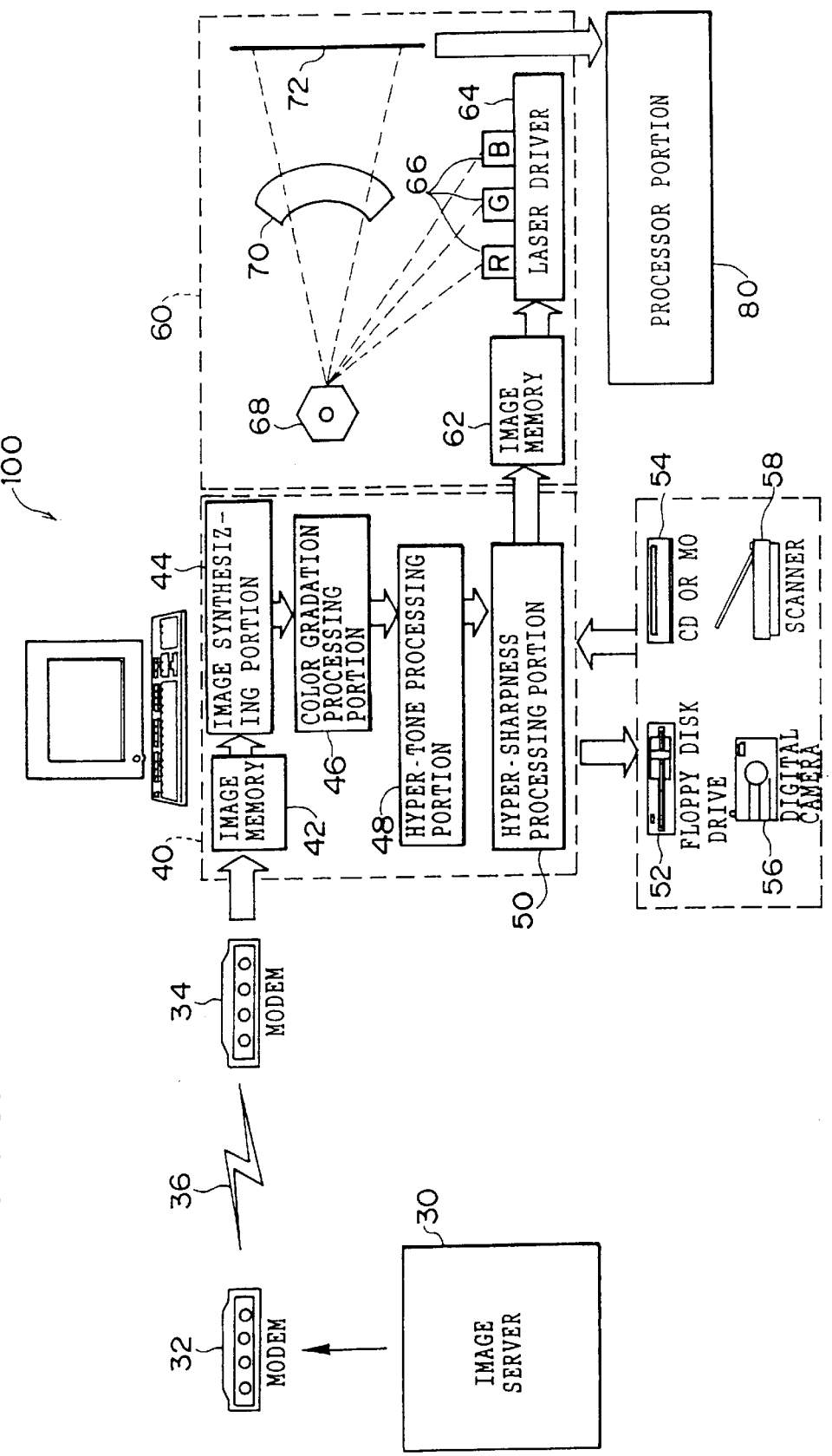
FIG. 2 is a schematic view which shows an example of a system which uses an image file encoded by the image encoding device.

As shown in FIG. 2, the system which uses an encoded image file is formed from an image server 30 in which an encoded image file or the like is recorded, a communication modem 32 which transmits the image file fetched from the image server 30 as image data, and a communication modem 34 which receives the image file, a communication line 36, and a digital laboratory system 100.

The digital laboratory system 100 is formed from an image processing portion 40, a laser printer portion 60, and a processor portion 80.

In the image processing portion 40, image data which is obtained from the image server 30 via the communication modems 32 and 34 and the communication line 36, an image file which is read by a scanner 58, a digital camera 56, an MO or a CD 54, a floppy disk 52, or the like is stored in an image memory 42. The image stored in the image memory 42 is subjected to image synthesis processing by the image synthesizing portion 44, is subjected to various types of image processings by a color gradation processing portion 46, a hyper-tone processing portion 48, and a hyper-sharpness processing portion 50, and is output to an image memory 62 of the laser printer portion 60 as image data for recording.

The laser printer portion 60 includes laser light sources 66 for R, G, and B. The laser printer portion 60 controls a laser driver 64 so that laser light, which is modulated in accordance with the image data for recording which was input from the image processing portion 40, is irradiated onto a photographic printing paper 72 and the image is recorded onto the photographic printing paper 72 by scan-exposure (in the present embodiment, by an optical system which mainly uses a polygon mirror 68 and an fθ lens 70). Further, the processor portion 80 effects respective processings of color development, bleach-fixing, washing, drying on the photographic printing paper 72, onto which the image is recorded by scan-exposure in the laser printer portion 60. In this way, the image is formed on the photographic printing paper 72.

Next, the operation of the present embodiment will be explained.

The RGB α format image file is read from the scanner, the floppy disk, the CD, or the like by the image file input portion 12 and the read image file is output to the image separating portion 14. The image separating portion 14 separates the RGB α format image file into four-channel image data of R, G, B, and α color components. The three-channel image data of R, G, and B is then output to the image encoding means 16 and the image data of the α channel 22 is output to the file generating means 18.

The image encoding means 16 can maintain the security of the image by encoding the image data of color components of R, G, and B. Moreover, the encoded image data of components of R, G, and B is output to the file generating means 18.

Figure 3A:
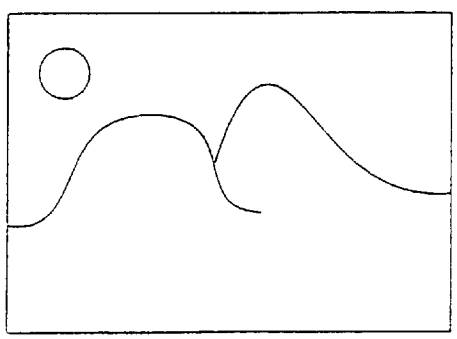
FIGS. 3A to 3D show the image synthesis process for an encoded image and an unencoded image.
Figure 3B:
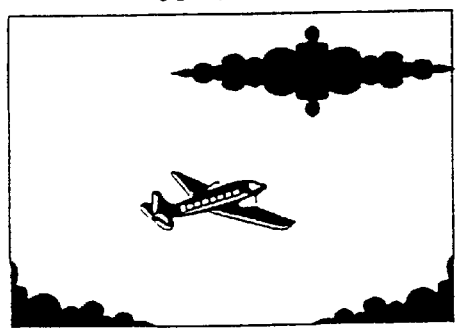

The file generating means 18 generates one file from the encoded R, G, and B image data and the image data of the α channel 22, which is not encoded, and outputs the file to the image server 30 as an encoded image file. Since the α channel 22 is not encoded, only the data of the α channel 22 of the image file which is encoded and output to the image server 30 is decoded. Because the positions of pixels corresponding to the region of α=1 can be recognized, even a device which does not have decoding right can known the rough shape of the image (FIG. 3B).

Next, a case in which an image which is not encoded (background image A) and an image which is encoded by the image encoding device 10 (superposed image B) are read and synthesized will be explained with reference to FIGS. 2 and 3A through 3D.

By operating the laboratory system 100, the background image A and the superposed image B from the image server 30 are stored in the image memory 42 of the laboratory system 100 via the communication modems 32 and 34 and the communication line 36. At this time, since the communication modems 32 and 34 and the communication line 36 do not have decoding rights, the security of the image can be maintained. Further, because the laboratory system 100 does have decoding rights, the image data of the two images recorded onto the image memory 42 are decoded in the image synthesizing portion 44 and thereafter subjected to image synthesis. Subsequently, the image data is subjected to the respective image processings of color gradation processing, hyper-tone processing, and hyper-sharpness processing and output to the image memory 62 of the laser printer portion 60 as image recording data. In the laser printer portion 60, the laser light which was modulated in accordance with the input image data for recording is irradiated onto the photographic printing paper 72, the image is recorded onto the photographic printing paper 72 by scan-exposure, and the photographic printing paper 72, on which the image is recorded, is conveyed to the processor portion 80. In the processor portion 80, the respective processings of color development, bleach-fixing, washing, drying are effected on the photographic printing paper 72, on which the image is recorded, and the image is formed on the photographic printing paper 72.

Figure 3C:
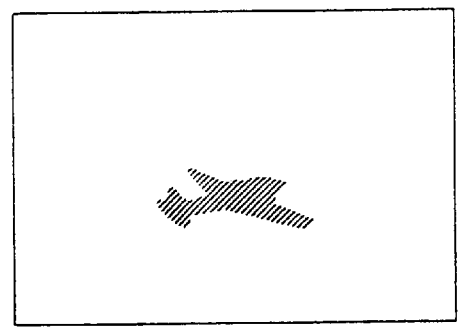

When all of the channels R, G, B, and α are encoded according to the conventional method, all of the image data must be transferred from the image server 30. However, in the case of the image data encoded in the present invention, only the image data of α channel 22 in the encoded image B is decoded and the positions of pixels corresponding to the region of α=1 can be recognized. At this time, in the background image A, because the encoded image B is completely superposed on the pixels corresponding to the regions where α=1 of the encoded image B, the pixels are written over the encoded image B and the information of the background image A is completely lost for all the written over positions on the synthesized image. Thus, only the data of the encoded image B at the positions at which α is not 1 is transferred to the background image A (FIG. 3C). In this way, not all of the image data is transferred and the transfer time can be reduced greatly.

Next, a second example of a system which uses an image file encoded by the image encoding device 10 of the present invention will be described briefly with reference to FIGS. 3A to 3D and 4.

The system shown in FIG. 4 is formed from an image server 110 in which an image file such as an image file encoded by the image encoding device 10 is stored, an image processing device 112 which effects various types of image processings, an image synthesizing device 114 which synthesizes the image fetched from the image server or the like, and a printer 116 which outputs the synthesized image.

The operation of the second example of the system which uses an image file encoded by the image encoding device 10 of the present invention will be explained.

An image A which is encoded by the image encoding device 10 and an image B which is not encoded are read from the image server 110 by the image processing device 112 and subjected to image processings (processings such as Auto White Balance, Auto Exposure, and the like) by the image processing device 112. Note that because the image processing device 112 does not have decoding rights, the security of the image can be maintained by the image processing device 112.

Figure 3D:
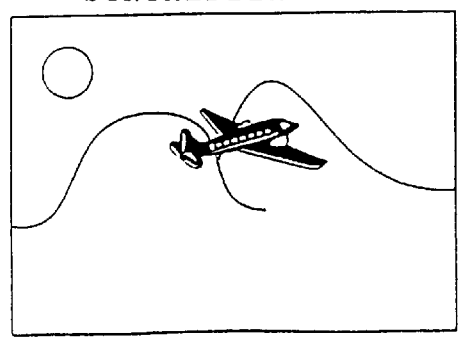

Further, in the same way as mentioned above, the image processing device 112 decodes only the image data of α channel 22 of the encoded image B and can recognize the positions of pixels corresponding to the region of α=1 (FIG. 3C). At this time, since the encoded image B is completely superposed on the pixels in the background image A corresponding to the region of α=1 of the encoded image B, the pixels are written over by the encoded image B and the information of the background image A is completely lost at those positions on the synthesized image (FIG. 3D). Thus, in the background image A, the image processing is carried out only on the data of the encoded image B at the positions at which α is not 1. In this way, the image processing is not effected on all of the image data and the processing time in the image processing can be greatly reduced.

The two images A and B which were subjected to image processing by the image processing device 112 are decoded by the image synthesizing device 114 having decoding rights, and thereafter, synthesized. The synthesized image is printed by the printer 116.

Any modem 32 and 34, communication line 36, and image processing device 112 which do not have decoding rights in the present embodiment may be used as intermediate processing means provided that they handle images. For example, an image processing device which performs conversion of color space in the image A, frequency emphasis, or the like may be used. In this case, in the same way as in the present embodiment, the configuration of the image can be recognized by detecting where α=0 and α=1 by the intermediate processing means which does not have decoding rights. Moreover, the processing time can be greatly reduced by effecting the processing only on the background image corresponding to the regions in which α is not 1.

Further, in the present embodiment, a description is given using the RGB channels and the α channel 22. However, the RGB can be replaced with four CMYK channels, and instead of the α channel 22, vector data may be used as the clipped information of the image.

In the present embodiment, the modems 32 and 34 and the communication line 36 are used. However, a local network, or a network such as the internet may be also used.

Still further, a program in which the procedure of image encoding in the present embodiment is executed by a computer may be recorded onto a recording medium such as a floppy disk, a hard disk, a CD-R, or the like and circulated.

What is claimed is:

1. An image encoding device comprising:
    input means for inputting an image file by reading an image file which represents an image;
    separating means for separating the image file into image data of predetermined components including at least image data of components having information specifying an area of the image to be clipped;
    encoding means for encrypting image data for maintaining security of, from among image data separated by the separating means, image data of components other than image data of components having information specifying an area of the image to be clipped, wherein limited information regarding the appearance of the image may be known from the encrypted image data while the details of the encrypted image data are unknown; and
    file generating means for generating an image file from image data of components encrypted by the encoding means and image data of components other than image data of components encrypted by the encoding means.

2. The image encoding device according to claim 1, wherein said image data of components other than image data of components having information specifying the area of the image to be clipped includes image data representing R, G and B channels.

3. An image encoding method comprising the steps of:
    reading an image file representing an image and separating the image file into image data of predetermined components including at least image data of components having information specifying the area of the image to be clipped;
    encrypting image data for maintaining security of, other than at least image data of components having information specifying the area of the image to be clipped, the separated image data, wherein limited information regarding the appearance of the image may be known from the encrypted image data while the details of the encrypted image data are unknown; and
    generating an image file from encrypted image data of components and image data of components other than encrypted image data of components.

4. The image encoding method according to claim 3, wherein said image data of components other than image data of components having information specifying the area of the image to be clipped includes image data representing R, G and B channels.

5. A recording medium for recording an image encoding procedure, wherein the image encoding procedure includes:
- a first step in which an image file representing an image is read and the image file is separated into image data of predetermined components including at least image data of components having information specifying the area of the image to be clipped;
- a second step in which image data of components other than image data of components having information specifying the area of the image to be clipped is encrypted for maintaining security of the separated image data, wherein limited information regarding the appearance of the image may be known from the encrypted image data while the details of the encrypted image data are unknown; and
- a third step in which an image file is generated from encrypted image data of components and image data of components other than encrypted image data of components.

6. The image recording medium according to claim 5, wherein said image data of components other than image data of components having information specifying the area of the image to be clipped includes image data representing R, G and B channels.

7. A recording medium for recording an image file, wherein an image file representing an image is read and the image file is separated into image data of predetermined components including at least image data of components having information specifying the area of the image to be clipped, image data of components other than image data of components having information specifying the area of the image to be clipped is encrypted for maintaining security of the separated image data, and an image file is generated from encrypted image data of components and image data of components other than encrypted image data of components, wherein limited information regarding the appearance of the image may be known from the encrypted image data while the details of the encrypted image data are unknown.

8. The image recording medium according to claim 7, wherein said image data of components other than image data of components having information specifying the area of the image to be clipped includes image data representing R, G and B channels.

9. An image encoding device comprising:
- encoding means for encrypting image data for maintaining security of image data of components other than image data of components having information specifying the area of an image to be clipped from among image data of components which includes image data of components having information specifying the area of the image to be clipped, wherein limited information regarding the appearance of the image may be known from the encrypted image data while the details of the encrypted image data are unknown; and
- file generating means for generating an image file from image data of components encrypted by the encoding means and image data of components other than image data of components encrypted by the encoding means.

10. The image encoding device according to claim 9, wherein said image data of components other than image data of components having information specifying the area of the image to be clipped includes image data representing R, G and B channels.

11. An image encoding method comprising the steps of:
- encrypting image data for maintaining security of image data of components other than image data of components having information for clipping an image from among image data of components which includes image data of components having information specifying the area of the image to be clipped, wherein limited information regarding the appearance of the image may be known from the encrypted image data while the details of the encrypted image data are unknown; and
- generating an image file from encrypted image data of components and image data of components other than image data encrypted for maintaining security of components.

12. The image encoding method according to claim 11, wherein said image data of components other than image data of components having information specifying the area of the image to be clipped includes image data representing R, G and B channels.

13. A recording medium for recording an image encoding procedure, wherein the image encoding procedure includes:
- a first step in which image data of components other than image data of components having information specifying the area of the image to be clipped is encrypted for maintaining security of image data of components which includes image data of components having information specifying the area of the image to be clipped, wherein limited information regarding the appearance of the image may be known from the encrypted image data while the details of the encrypted image data are unknown; and
- a second step in which an image file is generated from image data of components encrypted in the first step and image data of components other than image data of components encrypted in the first step.

14. The image recording medium according to claim 13, wherein said image data of components other than image data of components having information specifying the area of the image to be clipped includes image data representing R, G and B channels.

15. A recording medium for recording an image file, wherein image data of components other than image data of components having information specifying the area of an image to be clipped is encrypted for maintaining security of image data of components which includes image data of components having information specifying the area of the image to be clipped, and an image file is generated from encrypted image data of components and image data of components other than encrypted image data of components, wherein limited information regarding the appearance of the image may be known from the encrypted image data while the details of the encrypted image data are unknown.

16. The image recording medium according to claim 15, wherein said image data of components other than image data of components having information specifying the area of the image to be clipped includes image data representing R, G and B channels.

* * * * *